(12) United States Patent
Pfaffinger et al.

(10) Patent No.: US 10,289,103 B2
(45) Date of Patent: May 14, 2019

(54) FORMATION OF SET-UP FAMILIES FOR A MACHINING SYSTEM WITH A MACHINE TOOL

(71) Applicant: Siemens Aktiengesellschaft, München (DE)

(72) Inventors: Alexander Pfaffinger, München (DE); Christian Royer, Ottobrunn (DE)

(73) Assignee: Siemens Aktiengesellschaft (DE)

( * ) Notice: Subject to any disclaimer, the term of this patent is extended or adjusted under 35 U.S.C. 154(b) by 15 days.

(21) Appl. No.: 15/566,312

(22) PCT Filed: Mar. 30, 2016

(86) PCT No.: PCT/EP2016/056906
§ 371 (c)(1),
(2) Date: Oct. 13, 2017

(87) PCT Pub. No.: WO2016/165940
PCT Pub. Date: Oct. 20, 2016

(65) Prior Publication Data
US 2018/0299871 A1    Oct. 18, 2018

(30) Foreign Application Priority Data
Apr. 15, 2015   (DE) ..................... 10 2015 206 741

(51) Int. Cl.
*G05B 19/418*    (2006.01)

(52) U.S. Cl.
CPC ... *G05B 19/4187* (2013.01); *G05B 19/41835* (2013.01); *G05B 2219/32257* (2013.01);
(Continued)

(58) Field of Classification Search
None
See application file for complete search history.

(56) References Cited

U.S. PATENT DOCUMENTS

| | | | |
|---|---|---|---|
| 5,170,554 A | 12/1992 | Davis et al. | |
| 2015/0296671 A1 | 10/2015 | Pfaffinger et al. | |

(Continued)

FOREIGN PATENT DOCUMENTS

| | | |
|---|---|---|
| DE | 102012220904 A1 | 5/2014 |
| DE | 102012221259 A1 | 5/2014 |

OTHER PUBLICATIONS

Granger, C.:"Software Strategies for Cell Management"; in: Machinery and Production Engineering, Machinery Publishing Co.Ltd. Burgess Hill, GB; vol. 148; No. 3789; pp. 32/33,35; XP000151253; ISSN: 0024-919X.

(Continued)

*Primary Examiner* — Ryan A Jarrett
(74) *Attorney, Agent, or Firm* — Schmeiser, Olsen & Watts LLP.

(57) ABSTRACT

A machine tool having a tool magazine for tools, which the machine tool can hold one at a time in order to machine a workpiece is provided. A method for controlling the machine tool includes steps of detecting workpieces to be machined and grouping detected workpieces into set-up families in such a way that a set-up associated with the set-up family is sufficient for machining the workpieces belonging to the set-up family. The set-up includes tools, which can be simultaneously loaded in the tool magazine, and the set-up families are formed in such a way that the number of tools that must be loaded in order to machine the detected workpieces is minimized as far as possible.

11 Claims, 1 Drawing Sheet

(52) U.S. Cl.
CPC .............. *G05B 2219/33124* (2013.01); *G05B 2219/35156* (2013.01); *Y02P 90/205* (2015.11)

(56) References Cited

U.S. PATENT DOCUMENTS

| | | | | |
|---|---|---|---|---|
| 2017/0311491 | A1* | 10/2017 | Pfaffinger | .............. H05K 13/08 |
| 2017/0318716 | A1* | 11/2017 | Pfaffinger | .............. H05K 13/08 |
| 2017/0374745 | A1* | 12/2017 | Pfaffinger | .............. G06Q 10/06 |
| 2018/0007794 | A1* | 1/2018 | Pfaffinger | ........ G05B 19/41865 |
| 2018/0324991 | A1* | 11/2018 | Pfaffinger | .......... H05K 13/0882 |

OTHER PUBLICATIONS

Souza, R.B.R. De et al.:"A tool cluster based strategy for the management of cutting tools in flexible manufacturing systems"; in: Journal of Operations Management; vol. 10; No. 1; pp. 73-91; XP055283607; ISSN: 0272-6963, DOI:10.1016/0272-6963(91)90036-W.

De Souza, R.:"Tool-provisioning strategies for flexible manufacturing systems"; in: Robotics and Computer Integrated Manufacturing, Elsevier Science Publishers BV., Barking, GB; vol. 13; No. 1; pp. 31-39; XP004056856; ISSN: 0736-5845, DOI: 10.1016/S0736-5845(96)00027-0.

Kato, K. et al.:"Heuristics based integrated design environment for planning and scheduling in FMS"; in: Proceedings of The International Conference on Systems, Man and Cybernetics. Le Touquet; vol. -; pp. 737-742; XP010132482; DOI: 10.1109/ICSMC.1993.390803; ISBN: 978-0-7803-0911-1.

Mendes, M. et al.:"A mixed-integer linear programming model for part mix, tool allocation, and process plan selection in CNC machining centres"; in: International Journal of Machine Tools and Manufacture; vol. 43; No. 11; pp. 1179-1184; XP055283617; ISSN: 0890-6955; DOI:10.1016/S0890-6955(03)00052-X.

International Search Report for PCT Application No. PCT/EP2016/056906, dated Jul. 5, 2016.

* cited by examiner

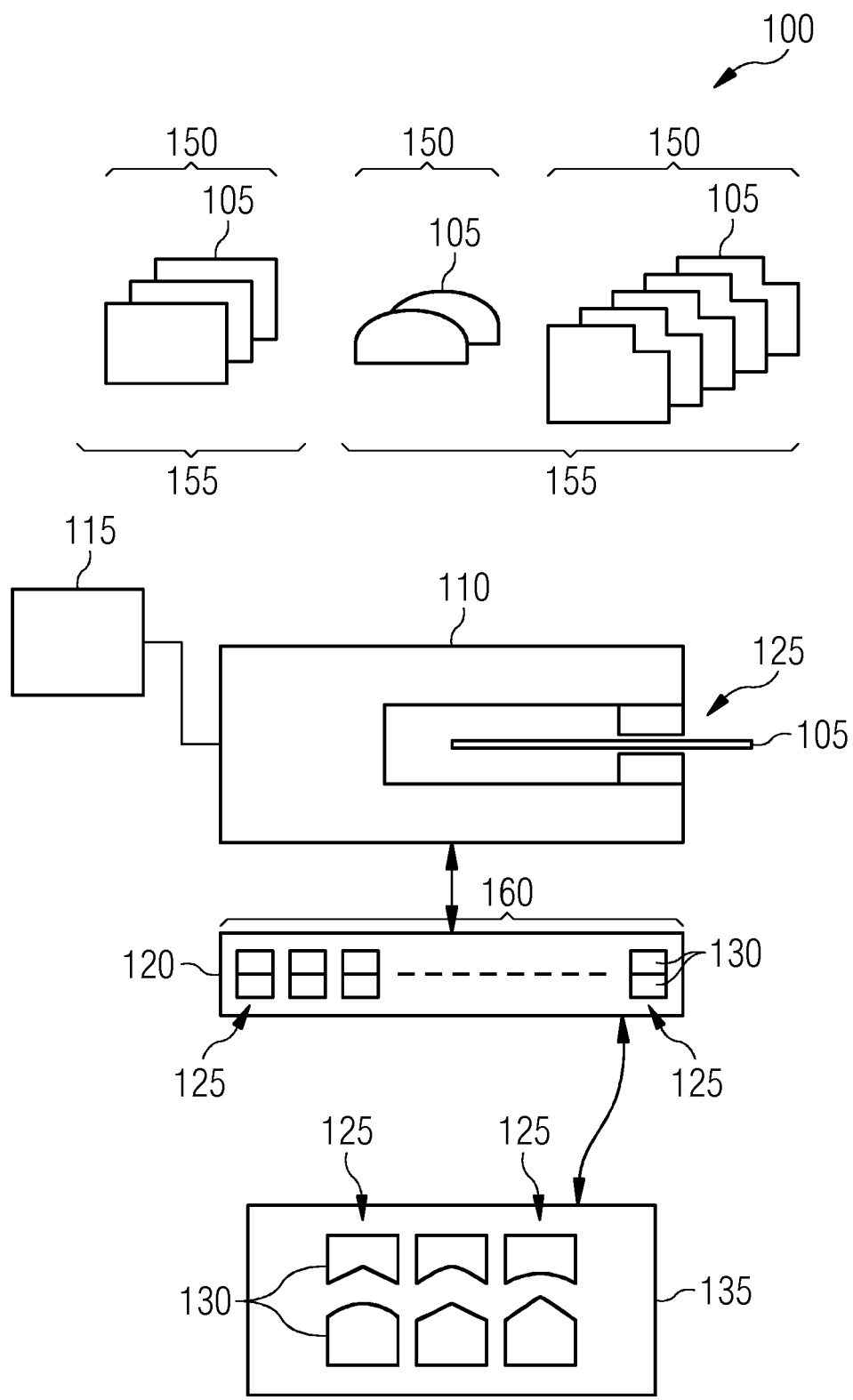

FORMATION OF SET-UP FAMILIES FOR A MACHINING SYSTEM WITH A MACHINE TOOL

CROSS-REFERENCE TO RELATED APPLICATIONS

This application claims priority to PCT Application No. PCT/EP2016/056906, having a filing date of Mar. 30, 2016, based off of German application No. DE 102015206741.6 having a filing date of Apr. 15, 2015, the entire contents of both of which are hereby incorporated by reference.

FIELD OF TECHNOLOGY

Embodiments of the present invention relate to a technique for the control of a machining system with a machine tool. In particular embodiments of the invention relate to the formation of set-up families of workpieces for machining with the machine tool.

BACKGROUND

A machine tool is configured to machine a workpiece by a plurality of different tools. In particular, the machine tool can comprise a punching machine that machines a flat workpiece such as a metal plate. For this purpose the machine tool can comprise a tool magazine with locations for a predetermined number of tools. The machine tool can take one of the tools out of the tool magazine and carry out one or more machining steps on the workpiece with it. Different workpieces usually require different tools for machining, so that the tool magazine first has to be appropriately fitted for a different workpiece.

The loading of tools in the tool magazine can be expensive and time-consuming and can require qualified personnel. In addition, there is a risk that the machine tool cannot work during an assembly process of a tool, and is halted.

R. B. R. DE SOUZA ET AL: "A tool cluster based strategy for the management of cutting tools in flexible manufacturing systems", JOURNAL OF OPERATIONS MANAGEMENT, Bd. 10, No. 1, 1 Jan. 1991 (1991, Jan. 1), pages 73-91, concerns a tool management system for a machine tool.

KATO K ET AL: "Heuristics based integrated design environment for planning and scheduling in FMS", Proc. Intl Conf SMC 93; 17 Oct. 1993 (1993, Oct. 17), pages 737-742, proposes a heuristic method for flow planning at a flexible production system.

SUMMARY

An aspect relates to providing an improved technique for grouping workpieces in order to be able to operate the machine tool with reduced effort and expense. A machine tool has a tool magazine for tools, from which the machine tool can hold one at any time for machining a workpiece. A method for controlling the machine tool comprises steps of registering workpieces to be machined and of grouping registered workpieces into set-up families in such a way that a set-up assigned to the set-up family is sufficient to machine the workpieces of the set-up family. The set-up here comprises tools which can be loaded simultaneously in the tool magazine, and the set-up families are formed in such a way that the number of tools that are to be loaded for machining the registered workpieces is minimized as far as possible. Workpieces of the set-up families are preferably then machined by means of the machine tool.

Through the described grouping, the effort and expense that must be expended to prepare the tools in the tool magazine can be minimized. A plurality of different workpieces can be machined by the machine tool without having to reload a tool. The machine tool can in this way be operated with reduced down-times. An increased profitability when operating the machine tool can be associated with this.

At least one of the tools can comprise a plurality of parts which must be assembled before loading the tool, and the set-up families can be formed in such a way that the number of tools that must be assembled prior to loading is minimized as far as possible.

One of the tools can, in particular, be a punching tool, a deep-drawing tool or an embossing tool each of which comprises at least one punch and one die as parts. The parts can need to be combined together, in particular depending on the workpiece, for example its material, its thickness or a working step that has previously been carried out, in order reliably to ensure the respectively necessary clearance between the parts. The assembly can comprise mounting the parts, which can require a manual activity. In addition, assembly can also require further intermediate steps, for example a calibration, a testing or a quality assurance. The parts can, furthermore, be held in an inventory, from which the parts must be individually selected and fetched. Dismounted tools can be dismantled, and their parts can be returned to the inventory.

Through the minimization of the tools that are to be loaded, the effort and expense for the assembly of the tools can, in particular, be reduced. A reloading of tools in the tool magazine which can comprise a removal of tools that are no longer required can also be reduced. The machine tool can in this way be operated with improved efficiency.

An inventory of parts can be provided, and a part of the inventory can be put together with different parts of the inventory to form different tools. A tool to be loaded can, for example, require a part that is contained in a tool that still has to be unloaded. Through the minimization of the tools to be loaded, waiting times that can result from this are minimized particularly effectively.

In a preferred form of embodiment, a number of workpieces of the same type are collected in one order. For the formation of the set-up families, the orders that are to be expected in a foreseeable future can be known. This period of time is also referred to as the long-term planning period, and can, for example, be a month or a year. Possibly, however, precisely which piece-counts of the different workpieces are to be machined is not yet known at the beginning. The orders can, moreover, have a machining time point which, for example, indicates when the machining is to begin or when it is to be finished. The machining of the orders is thus usually distributed over the long-term planning period. It is assumed here that the distribution is essentially even, and that no excessive clusters or pauses in the machining are present over the long-term planning period.

A time interval in the long-term planning period can be determined, and it is possible to determine those of the registered workpieces that should be machined in the determined interval. Then only those tools of the set-up are loaded that are required for machining the workpieces that are to be machined in the interval. After this, only those workpieces specified for the interval can be machined by means of the machine tool.

This approach is in particular advantageous when a plurality of intervals are formed within the long-term planning period. The intervals are preferably of equal length, or their starts are equidistant from one another. The interval can, for example, be a week or a day. At the beginning of an interval, the tool magazine is set up appropriately for the currently present orders, so that tools that are not used for current orders or workpieces are not loaded. A significant effort and expense for setting up the tool magazine can be saved in comparison with a loading of required tools at any given time only for the current order.

For example, when the long-term planning period is short, for example one week one day, only one interval can be formed which covers the entire long-term planning period. All the workpieces can in this way be machined in the same interval, and the advantages described above can also be achieved without the concept of intervals.

Preferably the set-up families are formed by methods of mixed integer programming. A computer-supported method of optimization is made available in this way, which can be used advantageously to solve the described assignment problem. The mixed integer programming, or mixed integer program (MIP) represents a known yet powerful optimization tool which is usually used for a different class of problem.

A plurality of workpieces of the same type are grouped to form one order, and the set-up families are formed in such a way that the expression M*O is maximized as far as possible over all the workpieces of all the set-up families, wherein M comprises the number of tools that must be loaded for machining the workpiece and O comprises the number of orders registered altogether for the workpiece.

In a refinement of this form of embodiment, the set-up families are formed in such a way that the expression (M−E)*O is maximized as far as possible, wherein E is the number of tools that must be loaded exclusively for machining the workpiece, and are not required for any other workpiece of the set-up family.

These two forms of embodiment are described more precisely below with reference to a mathematical description.

An order that is not assigned to any set-up family can be machined separately, in that the tools required for the machining of workpieces of the order are loaded in the tool magazine. The order can then be machined by means of the machine tool.

A flexibility in the planning of the machining of workpieces or of orders by the machine tool can in this way be increased. Workpieces or orders that do not fit well into one of the set-up families can, moreover, nevertheless be machined by means of the machine tool. The saving in the effort and expense of setting up the machine magazine can nevertheless be exploited. This procedure is in particular advantageous when intervals are used in the long-term planning period.

A computer program product comprises program code means for carrying out the method described when the computer program product runs on an execution apparatus or is stored on a computer-readable medium.

A control apparatus for the machine tool described above is designed to carry out the following steps: registering workpieces to be machined and of grouping registered workpieces into set-up families in such a way that a set-up assigned to the set-up family is sufficient to machine the workpieces of the set-up family. The set-up here comprises tools which can be loaded simultaneously in the tool magazine, and the set-up families are formed in such a way that the number of tools that are to be loaded for machining the registered workpieces is minimized as far as possible. The control apparatus can, moreover, be designed to control the machining of workpieces of the set-up family by means of the machine tool.

A machining system comprises the above-described machine tool as well as said control apparatus.

BRIEF DESCRIPTION

Some of the embodiments will be described in detail, with reference to the following figures, wherein like designations denote like members, wherein:

FIG. 1 shows a machining system with a machine tool.

DETAILED DESCRIPTION

More precise description of exemplary embodiments

FIG. 1 shows a machining system 100 for machining workpieces 105. The machining system 100 comprises a machine tool 110 with a control apparatus 115. The machine tool can in particular comprise a punching machine, for example a Trumatic® 5000 or Trumatic® 7000.

The machine tool 110 comprises a tool magazine 120 for holding a predetermined number of tools 125, and is designed to machine a workpiece 105 by one or more tools 125, which it can take from the tool magazine automatically. In one form of embodiment, the tool magazine 120 is divided into a linear magazine and a round magazine, where the round magazine can be reloaded while the machine tool 110 machines a workpiece 105. In the present case, an integrated tool magazine 120 is assumed, which can, for example, hold 71 tools 125 in the case of the Trumatic® 5000 and 91 tools 125 in the case of the Trumatic® 7000.

Some of the tools 125 can consist of two or more parts 130. In the case, for example, of a punching, embossing or deep-drawing process, one part 130 can comprise a die and another part 130 a punch. The tool 125 required for a predetermined machining process on a workpiece 105 can, for example, require that the tool 125 has different parts 130, depending, for example, on the thickness of the material of the workpiece 105, in order to ensure a predetermined clearance. Different parts 130 can also be required depending on the material or another parameter of the workpiece 105. The individual parts 130 are maintained in an inventory 135 which can, for example, be implemented as a warehouse system. The number of tools 125 to be mounted from parts 130 is usually a subset of the tools 125 that are to be loaded in the tool magazine 120.

In order to load a tool 125 in the tool magazine 120 it is usually necessary for all the required parts 130 to be determined and procured from the inventory 135; the parts 130 must then be assembled to the tool 125, for which purpose qualified, experienced personnel are usually required. Usually, when a tool 125 is loaded, another must be unloaded in order to create room in the tool magazine 120. The tool 125 that has been unloaded is usually dismantled into its parts 130, and the parts 130 are returned to the inventory 135. The unloading can also be understood as part of the loading process.

The preparation of the tool 125 is complex and expensive, and potentially requires a great deal of time. For machining one or a plurality of identical workpieces 105 of a first type the tools 125 required for this are usually loaded in the tool magazine 120, the workpiece or workpieces 105 are machined, and the tools 125 are unloaded again. If then one or a plurality of identical workpieces 105 of a second type are machined, the procedure is repeated. If the sets of tools 125 overlap at least partially, i.e. if at least one tool 125 is required for the machining of the workpieces of both types, the tool can remain loaded instead of first unloading and then reloading it when changing from machining workpieces 105 of the first type to machining workpieces 105 of the second type.

The idea of embodiments of the invention is to form groups of workpieces 105 as far as possible in such a way that the sets of tools 125 required for the machining assigned to the workpieces 105 overlap as much as possible, so that the tool magazine 120 only has to be set up once in order for it to be possible for workpieces 105 of a plurality of different types to be machined by means of the machine tool 110.

The machine tool 110 is usually not only used for machining single workpieces 105, but rather orders 150, wherein a piece-count of identical workpieces 105 which are machined in the same way, i.e. using in each case the same tools 125, is assigned to each order 150. For a production of a single workpiece 105, the piece-count of the associated order 150 can be equal to one. Workpieces 105 of an order 150 are usually machined one after another, without the set-up 160 being changed in between. For machining workpieces 105, a feed unit (not illustrated) can be provided which passes un-machined workpieces 105 one after another into the machine tool 110, and removes machined workpieces 105. The machine tool 110 can in this way work for a longer period of time without supervision.

Usually the orders 150 that are to be machined over a long-term planning period are at least approximately known. The long-term planning period can, for example, be one year. At the beginning of the period, for example about 90% of the orders 150 that are actually to be carried out within the long-term planning period may be known. Assumed piece-counts of the orders 150 can be estimated here. This information can, for example, be determined on the basis of an analysis of an earlier machining period.

It is proposed that the workpieces 105 of the orders 150 present within a long-term planning period are grouped into set-up families 155, wherein each set-up family 155 is assigned a set-up 160 of tools 125. The tools 125 of the set-up 160 are sufficient to machine all the workpieces of the set-up family 155, and can be loaded in the tool magazine 120 at the same time. This assignment is preferably carried out by means of the control apparatus 115.

The machining of the orders 150 is then no longer done in reference to orders, but with reference to a set-up family 155, in that the machine tool 110 is operated by the control apparatus 115 to machine all the orders 150 that are present or are released for execution for the workpieces 105 of a set-up family 155 with the same set-up 160 without changing the set-up.

For example, the long-term planning period can be divided into shorter segments of time, in particular into intervals of the same length. A time segment is also called a short-term planning period or a short-term planning horizon. The long-term planning period can, for example, be about 1 year, and the intervals each about 1 week.

A machining time point can be assigned to each order 150, wherein, in each interval, those orders 150 whose machining time point falls in the interval should be machined. The machining time point of an order 150 is usually not known before the start of the long-term planning period. Nevertheless, it is assumed that at the latest by the beginning of a predetermined short-term planning period, the orders 150 that are to be machined within the respective planning period are known. Usually it can be assumed that the machining time points of the orders 150 are essentially evenly distributed over the long-term planning period. At the beginning of an interval, preferably only those tools 125 of a set-up 160 are loaded in the tool magazine 120 for which at least one workpiece 105 or order 150 of the set-up family 155 should be machined in the current interval.

Usually a workpiece 105 or a workpiece type, of which an assigned piece-count should be machined, is assigned to each order 150. All the workpieces 105 of an order are of the same type and the machining should also be of the same type. A predetermined set of tools 125 is required for machining the workpieces 105 of an order 150, and these must be loaded in the tool magazine 120 of the machine tool 110. This set is known as the set-up 160. A set-up 160 can thus be related in a corresponding manner to a workpiece 105, to its workpiece type, or to an order 150 for machining a workpiece 105.

The loading of a tool 125 comprises a selection of parts 130 from a predetermined inventory 135, and an assembly of the tool 125 from the selected parts 130. The unloading usually comprises the dismantling of the tool 125 into its parts 130; the effort and expense required for this is not considered in more detail here. It can furthermore be assumed that a change in set-up is always performed completely, meaning that when changing from one set-up 160 to another, no tools 125 remain in the tool magazine 120.

Assessment Model

An assessment model is proposed below, with which set-up families 155 for the machine tool 110 can be assessed in terms of a quality criterion of "saving of tool preparations". Two mixed integer linear optimization problems (MIPs) are then presented, with which set-up families 155 can be determined which heuristically supply good solutions in terms of this quality criterion.

The aim of the approach described below is to minimize the effort and expense for loading the tool magazine 120 for the machining of orders, including the mounting of the tools that are to be loaded. Set-up families 155 should be formed for this purpose, each of which comprises as many tools 105 as possible. The workpieces 105 of a set-up family 155 can all be machined with the same set-up 160, and all the space necessary in the tool magazine 120 for the set-up 160 is available. If the set-up family 155 comprises more workpieces 105 than are at the time present for machining, then, when changing the set-up, preferably only those tools 125 are loaded that are required for the machining of the orders 150 that are present or that are provided for machining.

The following identifiers apply for the formal consideration:

c workpiece
C set of workpieces (workpiece types)
T set of tools
$T^s$ set of tools that must be mounted for machining (set-up)
$T^c$ set of tools required for c∈C
$T_c^s$ set of tools required for c∈C that must be mounted for machining
$C_t$ set of the workpiece types that require tool t
Cap capacity of the tool magazine
$Order_c$ number of orders for workpiece c in the long-term planning period
cl set-up family Stochastic Assessment Model
Given that $$n_k = \frac{\text{Number of days in the long-term planning period}}{\text{Number of days in the short-term planning period}}$$

Order$_c$ must not be greater than $n_k$. (If that is not the case, then Order$_c$ is set to this value).

$P_c$:=probability that the order is produced in the short-term planning period.

Preferably it can be assumed that the orders are distributed evenly over the short-term planning periods, and again preferably that a maximum of one order is to be produced for one workpiece within one short-term planning period. The orders are, moreover, preferably independent of one another. This means that the probability that a specified workpiece must be produced in a short-term planning period is:

$$p_c = \frac{\text{Order}_c}{n_k}$$

If workpieces are not produced separately from one another, but in a set-up family cl, then tool preparations can usually be saved, since tools that are required for a plurality of these orders with different workpieces only have to be mounted once.

The long-term planning period can be divided into intervals—also known as short-term planning periods—usually having the same length.

Separate Tool Preparations for Each Order

The expected value for the number of tool preparations for one group cl of workpieces in an interval, if for each order from cl the required tools are separately loaded and dismantled again after the machining, is:

$$EV \text{ (Separate tool preparations)} = \sum_{c \in cl} |T_c^s| \, p_c$$

Tool Preparations for One Set-Up Family cl

Set-ups of a plurality of set-up families are usually loaded in one interval.

The set of all tools that are required by workpieces from cl and which must be mounted for machining is identified as $T_{cl}^s$.

The probability that a tool $t \in T_{cl}^s$ is required in the interval for set-up family cl and must be mounted is:

$p$ (at least one $c \in cl$ is produced with $t \in T_c$) =

$$1 - p(\text{no } c \in cl \text{ is produced with } t \in T_c) = 1 - \prod_{c \in cl | t \in c} (1 - p_c)$$

The expected value for the number of tool preparations for a set-up family $cl \in Cl$ in one interval is thus found to be:

$$EV \text{ (Tool preparations for set-up family } cl) = \sum_{t \in T_{cl}'} \left(1 - \prod_{c \in cl | t \in c} (1 - p_c)\right)$$

The expected value for the number of tool preparations for a set of set-up families Cl in the interval can be found from the sum of the individual expected values for the set-up families $cl \in Cl$:

$$EV \text{ (Tool preparations for all set-up families)} = \sum_{cl \in Cl} \sum_{t \in T_{cl}'} \left(1 - \prod_{c \in cl | t \in c} (1 - p_c)\right)$$

Saving in tool preparations through the set-up family cl

The expected savings in tool preparations through the use of the set-up family cl can be found from the difference in the expected values for the preparation outlays without set-up families (cf. II.) and with set-up families (cf. III.):

$$\sum_{c \in cl} |T_c^s| \, p_c - \sum_{t \in T_{cl}^s} \left(1 - \prod_{c \in cl | t \in c} (1 - p_c)\right)$$

For the savings for a set of set-up families Cl we correspondingly obtain:

$$\sum_{cl \in Cl} \left( \sum_{c \in cl} |T_c^s| \, p_c - \sum_{t \in T_{cl}^s} \left(1 - \prod_{c \in cl | t \in c} (1 - p_c)\right) \right).$$

Optimization Model

The aim is to determine a given number of set-up families so that the saving in tool preparations is maximized as far as possible. The corresponding optimization model is non-linear as a result of the saving function given above. As a heuristic approach to a solution, an MIP is proposed in which the first term of the saving function is maximized.

In the MIP formulation, the following additional identifiers apply.

Additional Indices

Cl Set of set-up families to be formed

Binary Variables

Assign$_{c,cl}$ Variable that indicates whether a workpiece c has been assigned to the set-up family cl. (In this case it adopts the value 1, otherwise the value 0) Setup$_{t,cl}$ Variable that indicates whether a tool t must be loaded in the set-up of set-up family cl (In this case it adopts the value 1, otherwise the value 0)

P-Formulation

A mixed integer program (MIP) can be used to solve the given optimization problem. Standard tools are available to solve the MIP, for example GAMS, Scip or Gurobi, and these can be run on a standard commercial computer. The technique proposed here is not limited to MIP, but it is nevertheless recognized that a hard-to-formulate and hard-to-optimize problem can be solved with reduced effort and expense by means of MIP. MIP has the advantage here that for every solution found, how far it is (the "gap") from an optimum solution (in terms of the target function) is usually known. The search for an optimized solution can be continued further or interrupted depending on this information.

It is proposed that an MIP is supplied with the following target function:

$$\text{maximize} \sum_{cl \in Cl} \sum_{c \in C} |T_c^S| \, \text{Order}_c \, \text{Assign}_{c,cl}$$

s.t.:

(1) $\sum_{cl \in Cl} \text{Assign}_{c,cl} \leq 1 \quad c \in C$

-continued (2) $\sum_{c \in C_t} \text{Assign}_{c,cl} \leq |C_t| \text{Setup}_{t,cl} \quad t \in T, cl \in Cl$ (3) $\sum_{t \in T} \text{Setup}_{t,cl} \leq \text{Cap} \quad cl \in Cl$ $\text{Setup}_{t,cl} \in \{0, 1\} \quad t \in T, cl \in Cl$ $\text{Assign}_{c,cl} \in \{0, 1\} \quad c \in C, cl \in Cl$ Explanations:
Re. (1): Each order may be assigned to at most one set-up family.
Re. (2): A tool must be loaded if at least one workpiece that requires this tool is assigned to the set-up family.
Re. (3): The tools to be loaded must not exceed the capacity of the machine.

Improved IP Formulation

The argument of the target function of (VI.) can be reformulated as follows:

$$\sum_{cl \in Cl} \sum_{c \in C} |T_c^S| \text{Order}_c \text{Assign}_{c,cl} = \sum_{cl \in Cl} \sum_{t \in T^S} \sum_{c \in C_t} \text{Order}_c \text{Assign}_{c,cl}$$

Tools that are only used for one workpiece of the set-up family are entered positively in the maximization target function given above, and are "rewarded", although it does not matter whether they are also mounted precisely once in the context of the set-up family or in a single-production of the workpieces. No tool preparation is in fact saved for these tools through the formation of the set-up family. The MIP can be modified as follows, in order to eliminate this effect.

As additional, auxiliary variables, $z_{t, cl}$ are introduced, whose sum is to be maximized, and which are limited by the new restrictions (4) and (5). The target function value $z_{t,cl}$ is 0 if the tool t is only used for one workpiece of the set-up family cl. Otherwise it corresponds to the number of tool preparations for t when all the orders are produced individually.

$$\text{maximize} \sum_{cl \in Cl} \sum_{t \in T^S} z_{t,cl}$$

s.t.:

(1) $\sum_{cl \in Cl} \text{Assign}_{c,cl} \leq 1 \quad c \in C$ (2) $\sum_{c \in C_t} \text{Assign}_{c,cl} \leq |C_t| \text{Setup}_{t,cl} \quad t \in T, cl \in Cl$ (3) $\sum_{t \in T} \text{Setup}_{t,cl} \leq \text{Cap} \quad cl \in Cl$ (4) $\sum_{c \in C_t} \text{Order}_c \text{Assign}_{c,cl} \geq z_{t,cl} \quad t \in T^S, cl \in Cl$ (5) $M \left( \sum_{c \in C_t} \text{Assign}_{c,cl} - \text{Setup}_{t,cl} \right) \geq z_{t,cl} \quad t \in T^S, cl \in Cl$ $\text{Setup}_{t,cl} \in \{0, 1\} \quad t \in T^S, cl \in Cl$ $\text{Assign}_{c,cl} \in \{0, 1\} \quad c \in C, cl \in Cl$ $z_{t,cl} \geq 0 \quad t \in T^S, cl \in Cl$ Explanations:
Re. (1): Each workpiece may be assigned to at most one set-up family.
Re. (2): A tool must be loaded if at least one workpiece that requires this tool is assigned to the set-up family.
Re. (3): The tools to be loaded must not exceed the capacity of the machine.
Re. (4): The target function value $z_{t,cl}$ is limited upward by the number of tool preparations for t when all the workpieces are produced individually.
Without the restriction (5) the maximization function would mean that "=" applies here, and the model would be equivalent to the first-mentioned MIP formulation.
Re. (5): M represents a large, but not excessively large, number. A conceivable value for M would, for example be $$\sum_{c \in Cl} \text{Order}_c.$$

If a tool t is only used in precisely one workpiece of the set-up family cl, then $$\sum_{c \in Cl} \text{Assign}_{c,cl} = 1$$

and $\text{Setup}_{t,cl}=1$ and thus $z_{t,cl}=0$.

Possible Simplification

It can be helpful to equate the long-term planning horizon to the short-term horizon (the interval). Practically speaking, the planning horizons then no longer have to be considered. In this case C is the set of workpieces to be produced; $p_c=1$ applies, and the formulae given under (II.) and (III.) simplify as follows:

$EV(\text{Tool preparations for all set-up families})=|T_{Cl}^s|$

Savings with all set-up families:

$$\sum_{c \in cl} |T_c^s| p_c - \sum_{c \in cl} |T_{cl}^s|$$

With embodiments of the invention, set-up families for the workpieces to be produced can then be formed with minimized effort and expense for tool preparations.

Although embodiments of the invention have been more closely illustrated and described in more detail through the preferred exemplary embodiment, the invention is not restricted by the disclosed examples, and other variations can be derived from this by the expert without leaving the scope of protection of the invention.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:
1. A method for the control of a machine tool with a tool magazine for tools, of which the machine tool can hold one at any time for machining a workpiece, wherein the method comprises the following steps:

registering workpieces to be machined;

grouping registered workpieces into set-up families in such a way that a set-up assigned to the set-up family is sufficient to machine the workpieces of the set-up family;

wherein the set-up comprises tools which can be loaded simultaneously in the tool magazine;

wherein the set-up families are formed in such a way that the number of tools that are to be loaded for machining the registered workpieces is minimized as far as possible, wherein a plurality of workpieces of the same type are grouped to form one order and the set-up families are formed in such a way that the expression (M−E)*O is maximized as far as possible over all the workpieces of all the set-up families;

wherein M is the number of tools that must be loaded for machining the workpiece;

E is either zero or the number of tools that must be loaded exclusively for machining the workpiece;

and O is the number of orders registered altogether for the workpiece.

2. The method as claimed in claim 1, further comprising the step of machining workpieces of the set-up families by means of the machine tool.

3. The method as claimed in claim 1, wherein at least one of the tools comprises a plurality of parts which must be assembled before loading the tool, and the set-up families are formed in such a way that the number of tools that must be assembled prior to loading is minimized as far as possible.

4. The method as claimed in claim 3, wherein an inventory of parts is provided, and a part of the inventory can be put together with different other parts of the inventory to form different tools.

5. The method as claimed in claim 1, wherein furthermore:

a time interval is determined;

those of the registered workpieces that should be machined in the determined interval are determined;

only those tools of the set-up are loaded that are required for machining the workpieces that are to be machined in the interval; and only those workpieces specified for the interval are machined by the machine tool.

6. The method as claimed in claim 5, wherein all the workpieces should be machined in the same interval.

7. The method as claimed in claim 1, wherein the set-up families are formed by means of methods of mixed integer programming.

8. The method as claimed in claim 1, wherein an order that is not assigned to any set-up family is machined separately, in that tools that are required for the machining of workpieces of the order are loaded in the tool magazine, and the order is machined by means of the machine tool.

9. A computer program product comprising program code means stored on a non-transitory computer-readable medium for carrying out the method as claimed in claim 1.

10. A control apparatus for a machine tool with a tool magazine for tools, of which the machine tool can hold one at any time for machining a workpiece, wherein the control apparatus is designed to carry out the following steps:

registering workpieces to be machined; and grouping registered workpieces into set-up families in such a way that a set-up assigned to the set-up family is sufficient to machine the workpieces of the set-up family, wherein the set-up comprises tools which can be loaded simultaneously in the tool magazine, and wherein the set-up families formed in such a way that the number of tools that are to be loaded for machining the registered workpieces is minimized as far as possible, wherein a plurality of workpieces of the same type are grouped to form one order, and the set-up families are formed in such a way that the expression (M−E)*O is maximized as far as possible over all the workpieces of all the set-up families;

wherein M is the number of tools that must be loaded for machining the workpiece;

E is either zero or the number of tools that must be loaded exclusively for machining the workpiece;

and O is the number of orders registered altogether for the workpiece.

11. A machining system comprising a machine tool with a tool magazine for tools, of which the machine-tool can hold one at any time for machining a workpiece, as well as a control apparatus as claimed in claim 10.

* * * * *